(12) United States Patent
Seifert

(10) Patent No.: US 8,559,119 B2
(45) Date of Patent: Oct. 15, 2013

(54) MICROSCOPE STAGE WITH PIVOTABLE OBJECTIVE HOLDER

(75) Inventor: Roland Seifert, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 126 days.

(21) Appl. No.: 13/313,478

(22) Filed: Dec. 7, 2011

(65) Prior Publication Data

US 2012/0147462 A1 Jun. 14, 2012

(30) Foreign Application Priority Data

Dec. 10, 2010 (DE) .......................... 10 2010 061 170

(51) Int. Cl.
*G02B 21/24* (2006.01)
(52) U.S. Cl.
USPC .......................................... 359/821; 359/381
(58) Field of Classification Search
USPC ................................................. 359/381, 821
See application file for complete search history.

(56) References Cited

U.S. PATENT DOCUMENTS

| | | | | |
|---|---|---|---|---|
| 1,818,974 | A * | 8/1931 | Engelmann | 359/376 |
| 2,800,038 | A * | 7/1957 | Jonson | 74/822 |
| 3,489,030 | A * | 1/1970 | Mees | 74/531 |
| 4,092,063 | A * | 5/1978 | Koester | 353/71 |
| 5,103,338 | A | 4/1992 | Crowley et al. | |
| 5,861,982 | A * | 1/1999 | Takahama et al. | 359/381 |
| 6,094,299 | A * | 7/2000 | Schau et al. | 359/383 |
| 6,268,958 | B1 * | 7/2001 | Furuhashi | 359/381 |
| 6,327,080 | B1 * | 12/2001 | Brinkmann et al. | 359/381 |
| 6,359,731 | B1 * | 3/2002 | Koyama | 359/381 |
| 6,437,911 | B1 * | 8/2002 | Hasegawa | 359/381 |
| 6,937,390 | B2 * | 8/2005 | Akiyama et al. | 359/381 |
| 6,982,826 | B2 * | 1/2006 | Pfeifer | 359/381 |
| 7,046,437 | B2 * | 5/2006 | Karaki et al. | 359/383 |
| 7,085,046 | B2 * | 8/2006 | Horiguchi et al. | 359/381 |
| 7,327,514 | B2 * | 2/2008 | Uhl et al. | 359/381 |
| 2001/0003489 | A1 * | 6/2001 | Shiba et al. | 359/383 |
| 2001/0008461 | A1 * | 7/2001 | Koyama et al. | 359/380 |

(Continued)

FOREIGN PATENT DOCUMENTS

| | | |
|---|---|---|
| DE | 102004057451 A1 | 6/2006 |
| DE | 102005040834 A1 | 3/2007 |

(Continued)

OTHER PUBLICATIONS

Rust, M. J. et al., "Sub-diffraction-limit imaging by stochastic optical reconstruction microscopy (STORM)", Nature Methods, Oct. 2006, vol. 3, No. 10, pp. 793-795.

(Continued)

*Primary Examiner* — Mark Consilvio
(74) *Attorney, Agent, or Firm* — Hodgson Russ LLP

(57) ABSTRACT

A microscope stage (14) comprising a platform (16) and a holder (42) for a microscope objective (38), which holder is mounted on the platform (16) pivotally about a bearing axis (46) and movably along the bearing axis (46) and holds the objective (38), an operating element (50) which is coupled to the holder (42) and with which the holder (42) is pivotable about the bearing axis (46) and is movable along the bearing axis (46) for its positioning in an operating position, and a locking mechanism (60) which is actuatable by the operating element (50) and with which the holder (42) positioned in the operating position can be fixed to the platform (16).

19 Claims, 14 Drawing Sheets

(56) References Cited

U.S. PATENT DOCUMENTS

| | | |
|---|---|---|
| 2007/0047075 A1 | 3/2007 | Wahl et al. |
| 2009/0134342 A1 | 5/2009 | Hell et al. |
| 2010/0103510 A1* | 4/2010 | Kimura ................... 359/381 |
| 2010/0315707 A1* | 12/2010 | Gilbert et al. ........... 359/381 |

FOREIGN PATENT DOCUMENTS

| | | |
|---|---|---|
| DE | 10 2006 021 317 B3 | 10/2007 |
| DE | 10 2007 029 402 A1 | 1/2009 |
| DE | 10 2007 058 341 A1 | 6/2009 |
| DE | 20 2009 010 772 U1 | 11/2009 |
| DE | 10 2008 024 568 A1 | 12/2009 |
| JP | 2001091853 A * | 4/2001 |
| WO | 2004077123 A2 | 9/2004 |
| WO | 2006/127692 A2 | 11/2006 |
| WO | 2007/128434 A1 | 11/2007 |

OTHER PUBLICATIONS

Geisler, C. et al., "Resolution of $\lambda/10$ in fluorescence microscopy using fast single molecule photo-switching", Applied Physics A, Jun. 1, 2007, vol. 88, pp. 223-226.

* cited by examiner

MICROSCOPE STAGE WITH PIVOTABLE OBJECTIVE HOLDER

CROSS REFERENCE TO RELATED APPLICATIONS

This application claims priority of German patent application number 10 2010 061 170.0 filed Dec. 10, 2010, the entire disclosure of which is incorporated by reference herein.

FIELD OF THE INVENTION

The present invention relates generally to a microscope stage having a platform and a pivotable objective holder.

BACKGROUND OF THE INVENTION

In the recent past, light microscopic methods have been developed with which, based on a sequential, stochastic localization of individual point objects, in particular fluorescence molecules, image structures can be imaged that are smaller than the diffraction-dependent resolution limit of conventional light microscopes. Such methods are, for example, described in WO 2006/127692 A2; DE 10 2006 021 317 B3; WO 2007/128434 A1, US 2009/0134342 A1; DE 10 2008 024 568 A1; "Sub-diffraction-limit imaging by stochastic optical reconstruction microscopy (STORM)", Nature Methods 3, 793-796 (2006), M. J. Rust, M. Bates, X. Zhuang; "Resolution of Lambda/10 in fluorescence microscopy using fast single molecule photo-switching", Geisler C. et al, Appl. Phys. A, 88, 223-226 (2007). This new branch of microscopy is also referred to as localization microscopy. The applied methods are known in the literature, for example, under the designations (F)PALM ((Fluorescence) Photoactivation Localization Microscopy), PALMIRA (PALM with Independently Running Acquisition), GSD(IM) (Ground State Depletion (Individual Molecule return) Microscopy) or (F)STORM ((Fluorescence) Stochastic Optical Reconstruction Microscopy).

The new methods have in common that the structures to be imaged are prepared with markers that have two distinguishable states, namely a "bright" state and a "dark" state. When, for example, fluorescent dyes are used as markers, then the bright state is a state in which they are able to fluoresce and the dark state is a state in which they are not able to fluoresce. For imaging image structures with a resolution that is higher than the conventional resolution limit of the imaging optical system, a small subset of the markers is repeatedly brought into the bright state and thus it is so to speak activated. In this connection, the activated subset is to be chosen such that the average distance of adjacent markers in the bright state is greater than the resolution limit of the imaging optical system. The luminance signals of the activated subset are imaged onto a spatially resolving light detector, e.g. a CCD camera. Thus, of each marker a light spot is detected whose size is determined by the resolution limit of the imaging optical system.

In this way, a plurality of raw data single frames is captured, in each of which a different activated subset is imaged. Using an image analysis process, then in each raw data single frame the centroids of the light spots are determined which represent those markers that are in the bright state. Thereafter, the centroids of the light spots determined from the raw data single frames are combined to a total representation. The high-resolution image created from this total representation reflects the distribution of the markers. For a representative reproduction of the structure to be imaged sufficient signals have to be detected. Since however the number of markers in the respective activated subset is limited by the minimum average distance which two markers may have in the bright state, a great many raw data single frames have to be captured to completely image the structure. Typically, the number of raw data single frames is in a range between 10,000 and 100,000.

The time required for capturing one raw data single frame has a lower limit that is predetermined by the maximum image capturing rate of the imaging detector. This results in relatively long total capturing times for a series of raw data single frames required for the total representation. Thus, the total capturing time can take up to several hours.

Over this long total capturing time, a movement of the specimen to be imaged relative to the imaging optical system may occur. Since for creating a high-resolution total image all raw data single frames are combined after the determination of the centroids, each relative movement between specimen and imaging optical system that occurs during the capturing of two successive raw data singles frames impairs the spatial resolution of the total image. In many cases, this relative movement results from a systematic mechanical movement of the system, also referred to as mechanical drift which is caused, for example, by thermal expansion or shrinkage, by mechanical strains or by the change in the consistency of lubricants used in the mechanical components.

In the above-described high-resolution methods, it is of particular importance to ensure a drift-free positioning of the objective forming the imaging system relative to the specimen arranged on the platform. This can be achieved in that the objective is not, as usual, mounted to an objective revolver but directly to the platform. With such a design, the objective is arranged on the underside of the platform facing away from the specimen in the area of a through hole formed in the platform and images the specimen that is arranged on a specimen holder resting on the upper side of the platform through the through hole. As a result of the direct mounting of the objective to the platform, the distance over which the objective is mechanically coupled to the specimen holder is relatively short, whereby a mechanical drift occurring between the objective and the specimen holder can largely be prevented.

However, compared to a commonly used objective revolver, a design in which the objective is firmly mounted to the microscope stage has disadvantages with respect to the flexible handling of the microscope. Thus, when using an objective revolver it is, for example, possible to observe, at first for an overview, a relatively large image section by pivoting an objective having a suitable magnifying power into the imaging beam path, and to select within this image section a suitable target area which is then imaged by means of another objective having a higher magnifying power. Such a flexible handling is in particular also desirable in the above-described high-resolution microscopy methods.

SUMMARY OF THE INVENTION

Therefore, the object of the invention is to specify a microscope stage which can be used in high-resolution light microscopy, in particular in localization microscopy and which enables a precise and drift-free positioning of an objective relative to a specimen arranged on the microscope stage and, at the same time, allows the use of several objectives for different resolutions.

The invention solves this object by a holder which is mounted to the microscope platform pivotally about a bearing axis that is substantially parallel to an optical axis and movably along the bearing axis and which holds the objective, by an operating element which is coupled to the holder and with which the holder is pivotable about the bearing axis and movable along the bearing axis for its positioning in an operating position, and by a locking mechanism which is actuatable by means of the operating element and with which the holder positioned in the operating position can be fixed to the platform.

The invention thus provides an objective holder which, by means of an operating element that is to be actuated by the user, is moved into an operating position in which the holder and thus the objective are arranged directly on the platform and is fixed thereto by a locking mechanism that is likewise actuated by means of the operating element. This fixing of the holder to the platform ensures a drift-free positioning of the objective relative to the specimen resting on the platform.

The objective can be mounted to the holder via a focusing drive, e.g. a piezo-ceramic actuator. Thus, it is achieved that also the focusing of the objective, which is required in any case, is largely free of drift.

In its operating position, the holder carrying the objective will usually be arranged on the underside of the platform in the area of a through hole formed in the platform. Through this through hole, the objective mounted to the holder then images the specimen that is mounted on a specimen holder which rests on the upper side of the platform and covers the through hole.

The inventive microscope stage can be mounted onto a conventional microscope stand which includes an objective revolver having several microscope objectives. When the holder is pivoted out of its operating position, then there is sufficient space in the area of the through hole formed in the platform to pivot one of the microscope objectives held on the objective revolver into the imaging beam path.

When the microscope is equipped with both the inventive microscope stage and a conventional objective revolver, then for example a sensor can be provided which detects when the holder carrying the objective is pivoted into its operating position. A corresponding sensor signal output by the sensor can then be used to bring the objective revolver into a position below the platform in which it is guaranteed that the microscope objectives held on the objective revolver do not collide with the holder arranged in its operating position. For this, it is, for example, conceivable to not fully equip the objective revolver with microscope objectives so that, in a specific position of the objective revolver below the platform, sufficient space is available for the holder.

The holder is mounted both pivotally about the bearing axis and movably along the bearing axis. By means of this movable mounting, the objective mounted to the holder can be moved away from the specimen in the direction of the optical axis before it is pivoted out of the imaging beam path. In light microscopic methods in which an immersion liquid is present between the objective and the specimen it is advantageous to move the objective away from the specimen in this way to increase the achievable resolution. In this case, moving the holder along the bearing axis makes it possible to separate the objective softly from the emulsion liquid or, respectively, to immerse it therein.

Preferably, the operating element is formed as a lever which for pivoting the holder about the bearing axis is pivotable in a first plane within a first pivoting range and for moving the holder along the bearing axis is pivotable in a second plane within a second pivot range, which second plane is perpendicular to the first plane. By means of such a lever which is pivotable in two planes that are perpendicular to each other the holder can easily and precisely be moved into and out of its operating position.

In a preferred embodiment, the locking mechanism has a receptacle which is mounted to the platform and a locking element which is coupled to the lever via an articulated chain and which can be pivoted into the receptacle by pivoting the lever within the first pivoting range and can be tightened in the receptacle by pivoting the lever beyond the second pivoting range for fixing the holder to the platform. In this embodiment, thus a pivoting range going beyond the second pivoting range is provided for pivoting the lever in the second plane. While the second pivoting range serves to move the holder along the bearing axis into its operating position (e.g. to bring it into contact with the underside of the platform), this additional range serves to lock the holder already arranged in the operating position in a drift-free manner.

In a further advantageous development the articulated chain comprises a bistable articulated link which is coupled to the locking element and changes from a first stable position to a second stable position in the articulated chain when the lever is pivoted out of the second pivoting range and beyond this range. In this case, the locking element is released from the receptacle via the articulated chain when the bistable articulated link is in a first stable position, whereas it is tightened in the receptacle via the articulated chain when the bistable articulated link is in the second stable position. The change between the first stable position and the second stable position of the above-mentioned articulated link is caused in that the lever is pivoted beyond the second pivoting range. Thus, by means of one single actuation of the lever the user can at first bring the holder into its operating position and then lock the holder in this operating position to the platform. This makes the handling of the inventive microscope stage particularly easy.

Preferably, the articulated chain provides an increased resistance to the operation of the lever when the bistable articulated link changes between the first stable position and the second stable position. This resistance to operation is perceived by the user when, at first, the user actuates the lever so far that the holder is brought into its operating position along the bearing axis and then actuates the lever with increased force so to speak beyond a point of increased resistance to clamp the holder to the platform. When this point of increased resistance is overcome, the resistance to operation again decreases. The holder is thus clamped to the platform in a so to speak self-locking manner. This clamping can only be released again by means of the lever. Due to the perceivable change in the resistance to operation, the user can precisely detect when the holder is actually locked to the platform.

Preferably, the locking element is a pin having an enlarged pin head, whereas the receptacle is a clamping plate which is integrated in the platform and has a contact surface for the pin head and a recess which is open at one side and into which the pin can be pivoted. The pin head can then be tightened against the contact surface for fixing the holder to the platform.

In this embodiment, the pin can be formed as a screw and one of the articulated links, of which the articulated chain is composed, can be formed as a threaded sleeve into which the screw is screwed. This enables a particularly compact structure of the locking mechanism to be actuated by the lever.

Preferably, the force with which the holder can be tightened against the platform can be adjusted by varying the screwing depth with which the screw is screwed into the threaded sleeve. In this embodiment, thus by means of the screwing depth the lifting height over which the screwed is tightened against the platform can be varied.

In a further advantageous embodiment, the microscope stage has a pressure spring arranged substantially parallel to the first plane, whose one end is rotatably mounted to the holder and whose other end is rotatably mounted to the platform. When the lever is pivoted from one lever end position to the other lever end position of the first pivoting range, the pressure spring is at first compressed against its spring force and then again relaxes approximately in the mid-position of the first pivoting range due to its spring force. As a result thereof, the lever is biased in the direction of its two lever end positions. The pressure spring makes it easier for the user to pivot the holder and thus the objective into and out of the imaging beam path in a defined manner. This makes the handling of the microscope stage particularly easy.

According to a further aspect of the invention, a microscope is provided which comprises a microscope stage of the above-described type and an objective revolver for the selective pivoting of one of several microscope objectives held on the objective revolver into the imaging beam path.

BRIEF DESCRIPTION OF THE DRAWINGS

Exemplary embodiments of the present invention are described in more detail below with reference to the drawings, in which.

DETAILED DESCRIPTION OF THE INVENTION

Figure 1:
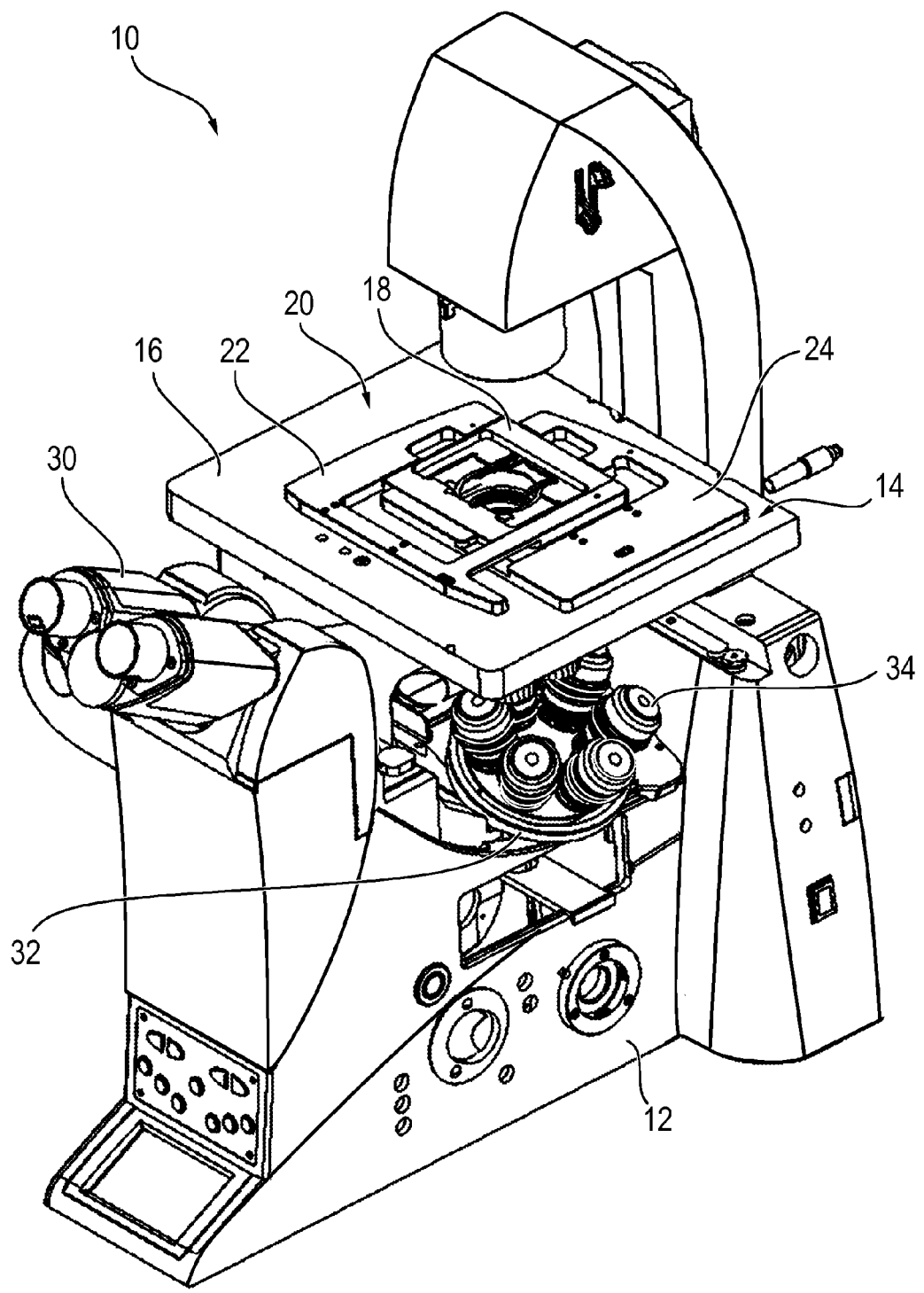
FIG. 1 shows a perspective view of a high-resolution light microscope as an embodiment.
Figure 2:
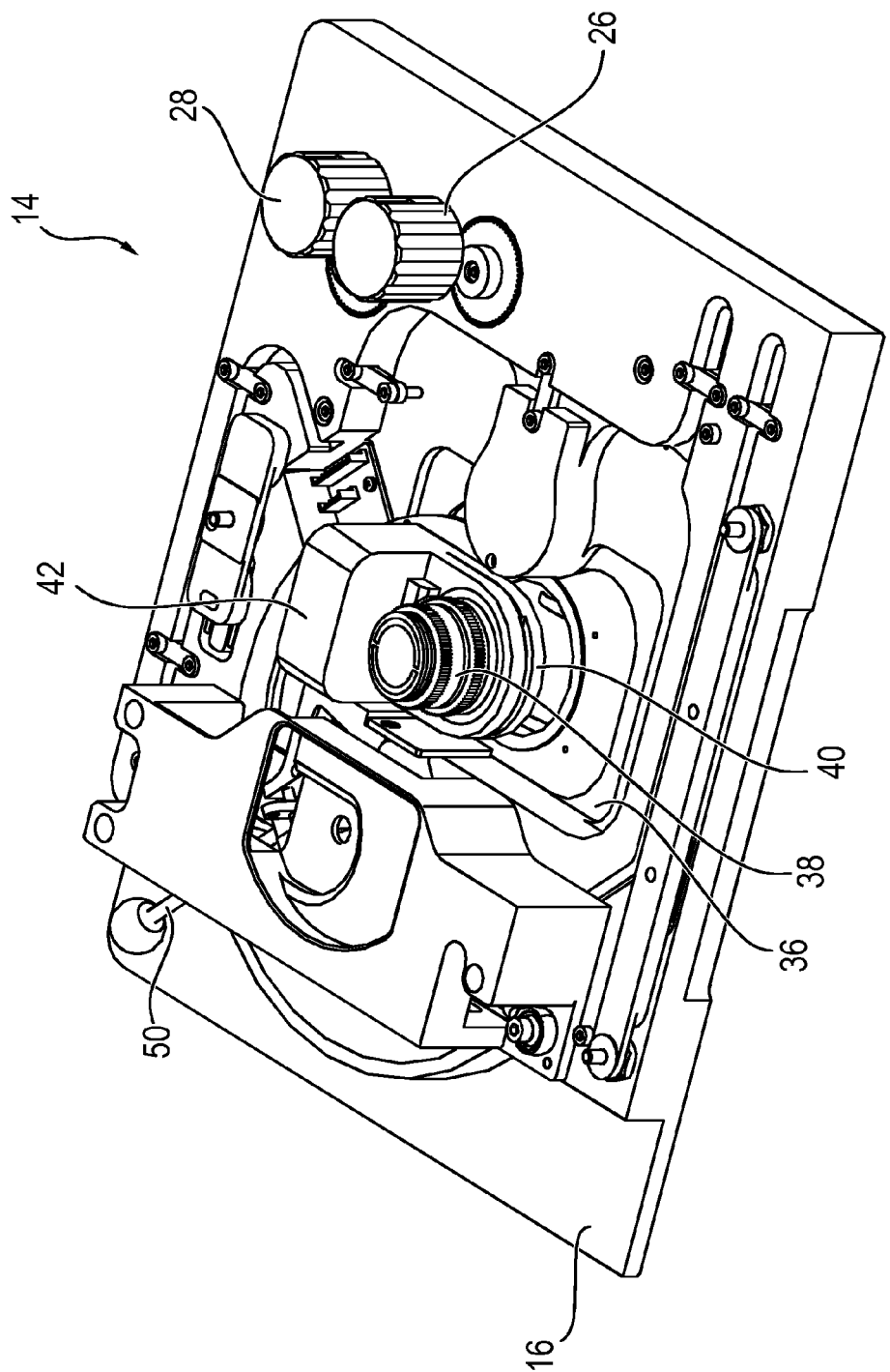
FIG. 2 shows a perspective bottom view of the microscope stage of the light microscope according to FIG. 1.
Figure 3:
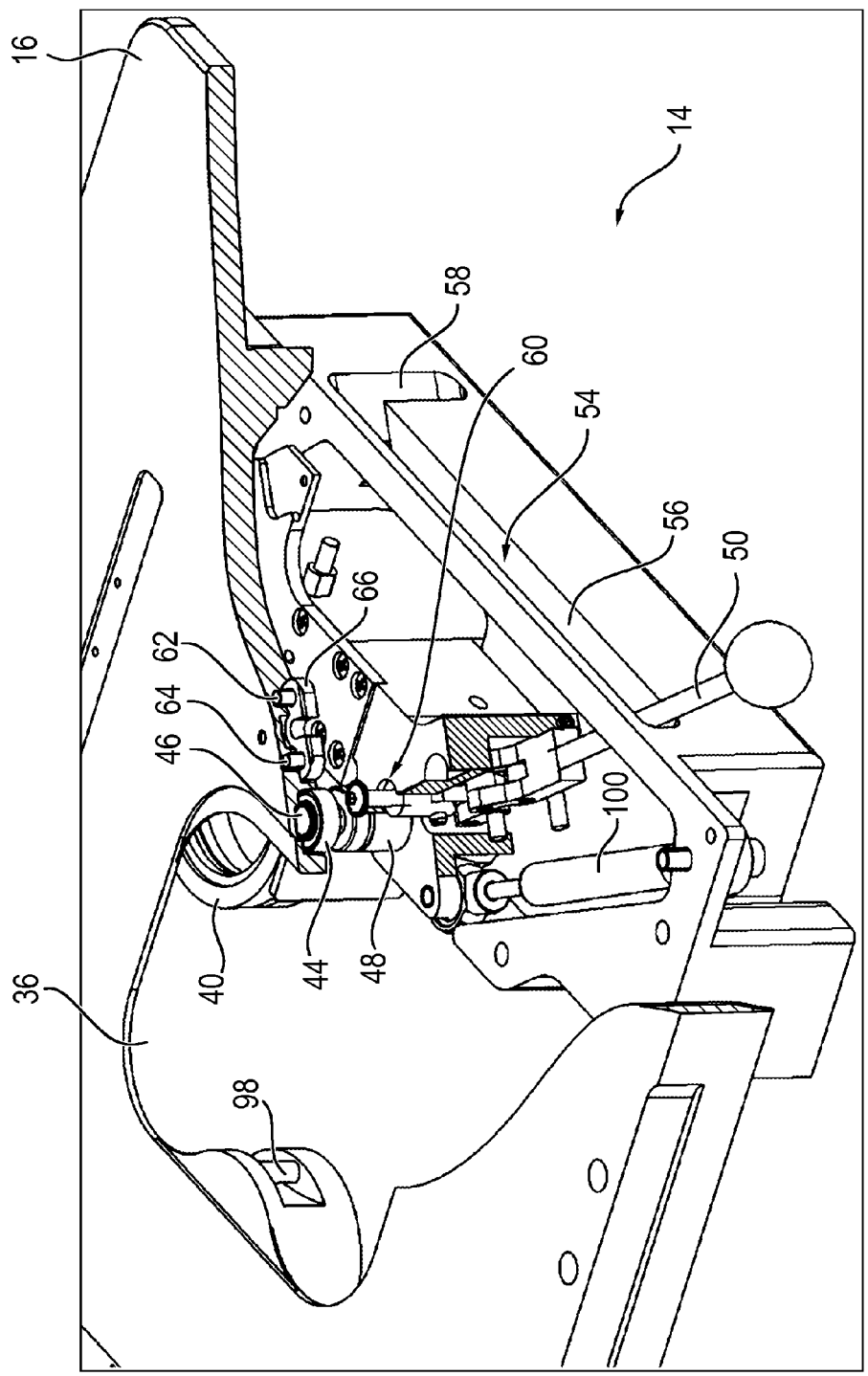
FIGS. 3-7 show perspective views of the microscope stage, in which a part of the microscope stage is omitted for explaining how a holder is pivoted into an operating position and is fixed to the platform.
Figure 4:
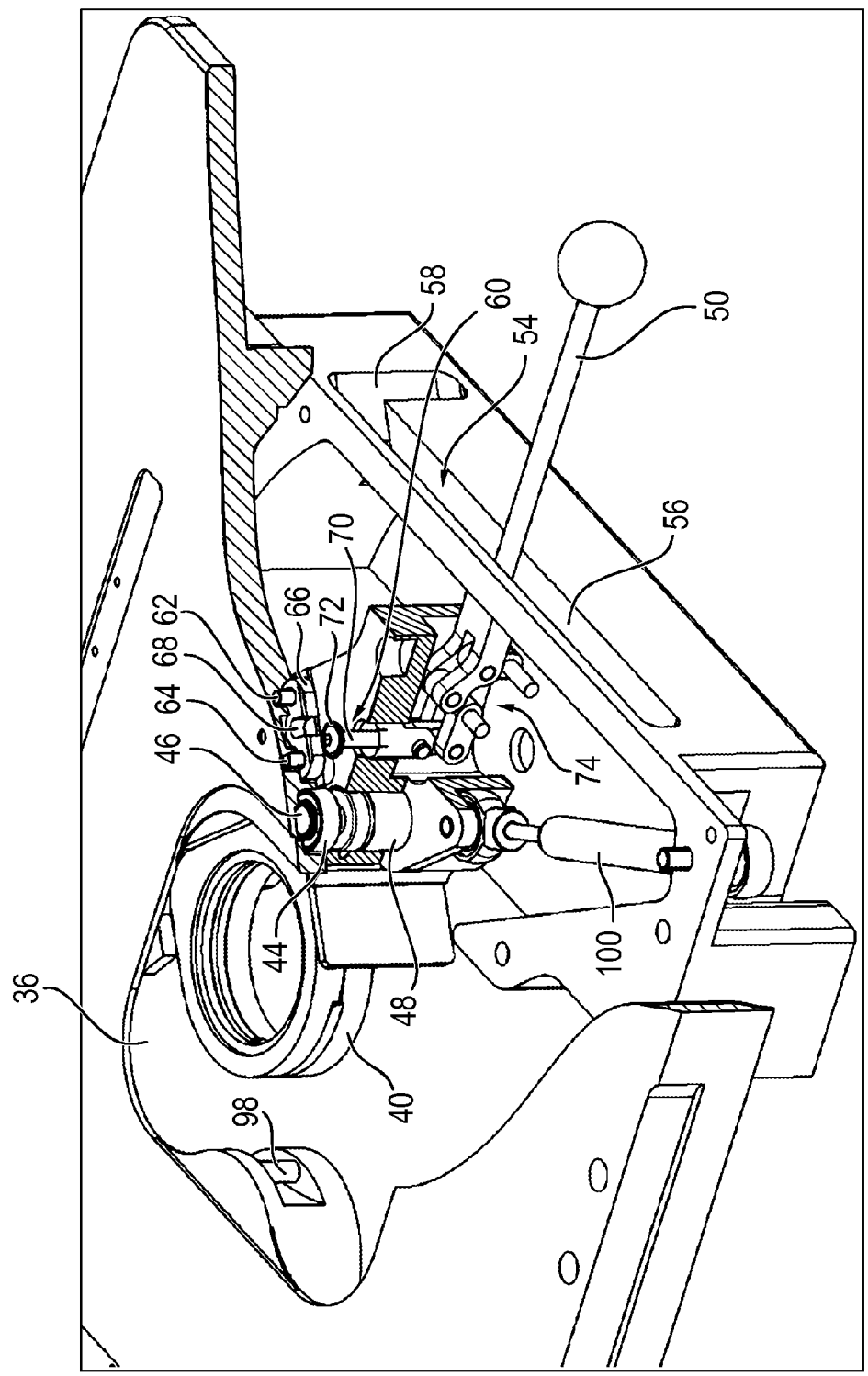
Figure 5:
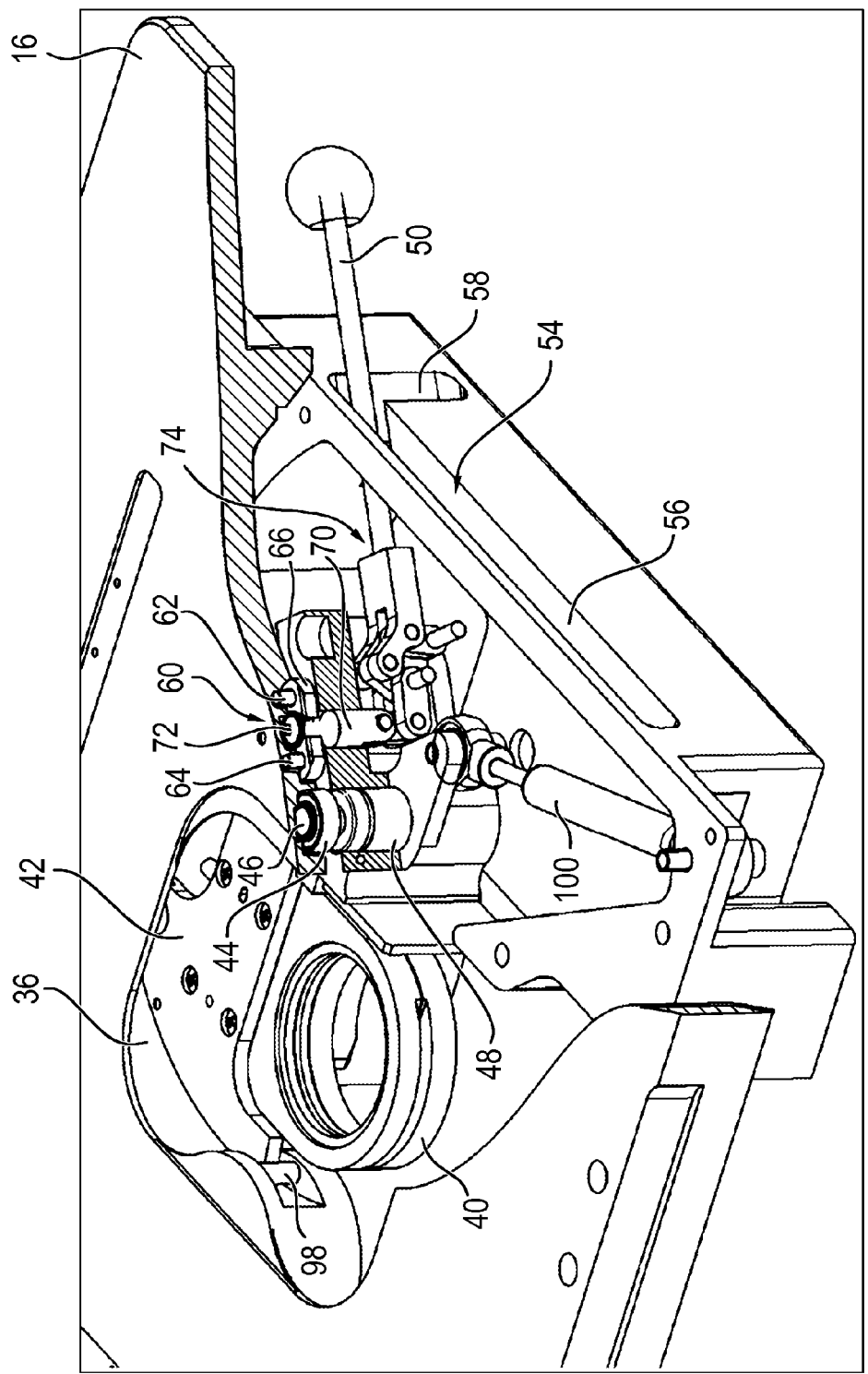

In the following, at first the total structure of a high-resolution light microscope 10 is explained with reference to FIGS. 1 and 2. Here, only those components of the light microscope 10 are described which are required for understanding the present invention.

The light microscope 10 has a microscope stand 12 on which a microscope stage 14 is screwed. The microscope stage 14 has a platform 16 on which a specimen holder 18 rests. On the platform 16, there is a positioning device 20 which is composed of a first slider 22 and a second slider 24. The two sliders 22 and 24 are mechanically decoupled from each other and serve to displace the specimen holder 18 on the platform 16 in two orthogonal directions. For this, two handwheels 26 and 28 are mounted to the underside of the platform, as shown in FIG. 2.

The light microscope 10 further has a pair of eyepieces 30 mounted to the microscope stand 12 as well as an objective revolver 32 holding several microscope objectives 34. In the illustration of FIG. 1, which shows the light microscope 10 with the microscope stage 14 lifted from the microscope stand 12, the objective revolver 32 which is otherwise covered by the microscope stage 14 is visible.

As shown in the bottom view of FIG. 2, an objective 38 is arranged on the underside of the platform 16 below a through hole 36 formed in the platform 16. The objective 38 is screwed into a focusing drive 40 via an objective thread. The focusing drive 40 is, for example, a piezo-ceramic actuator which moves the objective 38 along its optical axis for focusing on the specimen to be imaged. The focusing drive 40 is mounted to a holder 42 which is pivotable below the platform 16.

The holder 42 and the components which interact therewith and serve to pivot the objective 38 with the focusing drive 40 out of and into the imaging beam path will be explained in more detail in the following with reference to FIGS. 3 to 7.

In FIGS. 3 to 7 it is illustrated how the holder 42 is moved from a position in which it is pivoted out of the imaging beam path to an operating position in which the objective 38 mounted to the holder 42 via the focusing drive 40 is in the imaging beam path and is subsequently tightened against the platform 16. At first, with reference to FIGS. 3 to 7, the individual components are described by which the pivoting of the holder 42 is made possible. In FIGS. 3 to 7, the holder 42 is each time illustrated with the focusing drive 40 but without the objective 38.

The holder 42 is pivotable at a pivot bearing 44, which is mounted to the platform 16, about a bearing axis 46 that substantially extends parallel to the optical axis of the imaging beam path. The plane in which the holder 42 can be pivoted is parallel to the platform 16. The holder 42 is further coupled to a so-called Z bearing 48 which is arranged on the bearing axis 46 below the pivot bearing 44. The Z bearing 48 makes it possible to move the holder 42 upward and downward along the bearing axis 46.

The holder 42 is coupled to a pivot lever 50 which serves to pivot the holder 42 about the bearing axis 46 and to move it along this axis. The pivot lever 50 is held in a lever guide 54 which has a first horizontal guide section 56 and a second vertical guide section 58 extending from an end of the first guide section 56. The first horizontal guide section 56 defines a first horizontal pivoting plane in which the pivot lever 50 can be moved to pivot the holder 42 about the bearing axis 46. The second vertical guide section 58 defines a second vertical pivoting plane in which the pivot lever 50 can be moved to displace the holder 42 along the bearing axis 46.

Pivoting of the holder 42 about the bearing axis 46 and/or moving it along the bearing axis 46 take place in particular merely mechanically by the mechanical coupling of the holder 42 to the pivot lever 50. In an alternative embodiment, the pivoting and/or the moving of the holder 42 can also take place automatically or semi-automatically. For this, in particular at least one drive unit, preferably an electric motor, is provided by means of which the holder 42 can be pivoted about the bearing axis 46 and/or can be moved along the bearing axis 46. The activation and/or control of the drive unit in particular takes place via the pivot lever 50. In a further alternative embodiment, the pivoting and/or the moving can also take place by a combination of a mechanical coupling to the pivot lever 50 and a drive unit.

Figure 17:
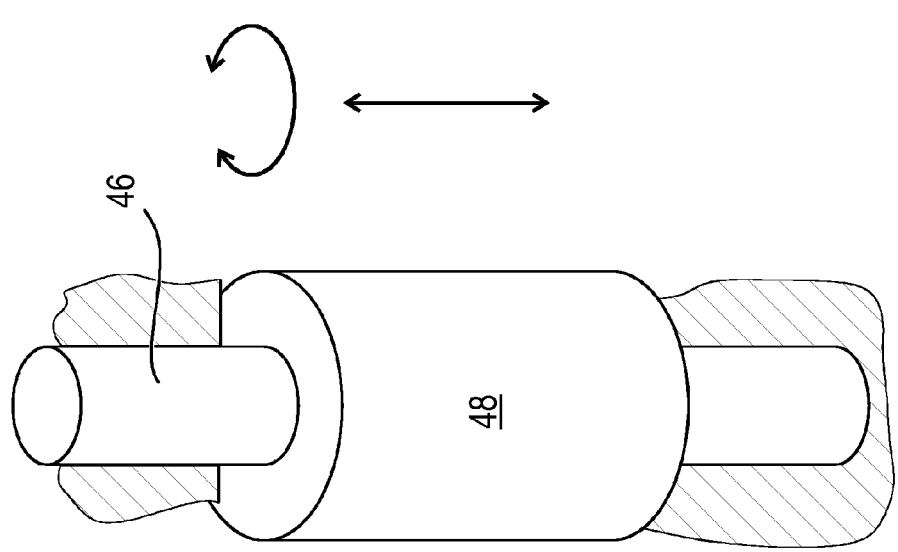
FIG. 17 shows a schematic illustration of an alternative mounting of the holder.

In an alternative embodiment of the invention, the bearing axis 46 can, different from what has been described above, not be connected rotatably to the platform 16 via a pivot bearing 44 but can be mounted to the platform 16 in a stationary and rotationally fixed manner. In this embodiment, the Z bearing 48 can be designed such that it can be rotated about the bearing axis 46 and can be moved along the bearing axis 46. The holder 42 is connected to the Z bearing 48 so that the holder 42 is pivotable about the bearing axis 46 and is movable along the bearing axis 46. In FIG. 17, the afore-described mounting is schematically illustrated. This embodiment has the advantage that a pivot bearing 44 can be dispensed with so that a simple cost-efficient and space-saving structure is achieved.

The inventive microscope stage 14 further has a locking mechanism which is generally identified with the reference sign 60 and serves to fix the holder 42 to the platform 16 in a manner described further below. The locking mechanism 60 comprises a clamping plate 66 mounted to the platform 16 via pins 62 and 64. As can be best seen in FIG. 4, the clamping plate 66 has a recess 68 which serves to receive a tightening screw 70. The tightening screw 70 has an enlarged screw head 72 which can be brought into contact with the clamping plate 66 from above when the tightening screw 70 is received in the recess 68.

The tightening screw 70 forms a locking element which can be tightened against the clamping plate 66 by actuation of the pivot lever 50 to lock the holder 42 to the platform 16. For this, the pivot lever 50 is coupled to the tightening screw 70 via an articulated chain generally identified with the reference sign 74. The structure of the articulated chain 74 can be best seen in the enlarged view of FIG. 16.

The articulated chain 74 has a first articulated link 76 which is pivotable about a first axis of articulation 78. The first axis of articulation 78 is firmly mounted to the holder 42. A second articulated link 80 of the articulated chain 74 is firmly mounted to an end of the pivot lever 50 and is coupled via a second axis of articulation 82 pivotally to the first articulated link 76. The articulated chain 74 further has a third articulated link 84 which is mounted pivotally about a third axis of articulation 86 that is stationary relative to the holder 42. Further, the third articulated link 84 is coupled to the second articulated link 80 pivotally about a fourth axis of articulation 88. A fourth articulated link 90 of the articulated chain 74 is coupled to the third articulated link 84 pivotally about a fifth axis of articulation 92. Finally, the articulated chain 74 has a fifth articulated link 94 which is coupled to the fourth articulated link 84 pivotally about a sixth axis of articulation 96. The fifth articulated link 94 is a threaded sleeve into which the tightening screw 70 is screwed.

The microscope stage 14 further has a pivot stop 98 which forms the limit for the pivoting motion of the holder 42 about the bearing axis 46. The stop for the upward movement of the holder 42 along the bearing axis 46 is formed by the underside of the platform 16 itself.

A pressure spring 100, which is for example designed as a gas pressure spring, is mounted with one end rotatably to the holder 42 and with its other end rotatably to a stationary part of the microscope stage 14. By this arrangement it is guaranteed that the pressure spring 100 exerts biasing forces on the pivot lever 50 which bias the pivot lever 50 in the direction of its lever end positions which are defined by the two ends of the first horizontal guide section 56 of the lever guide 54.

When the pivot lever 50 is moved from one of the two lever end positions to approximately the mid-position of the pivoting range defined by the first horizontal guide section 56 of the lever guide 54, then the pressure spring 100 is compressed against its spring force. This results in a biasing toward the lever end position out of which the pivot lever 50 is just moved. When the pivot lever 50 is subsequently moved beyond the mid-position of the afore-mentioned pivoting range in the direction of the other lever end position, then the pressure spring 100 relaxes due to its spring force, as a result whereof it biases the pivot lever 50 into the lever end position into which the pivoting motion of the pivot lever 50 is directed.

Figure 13:
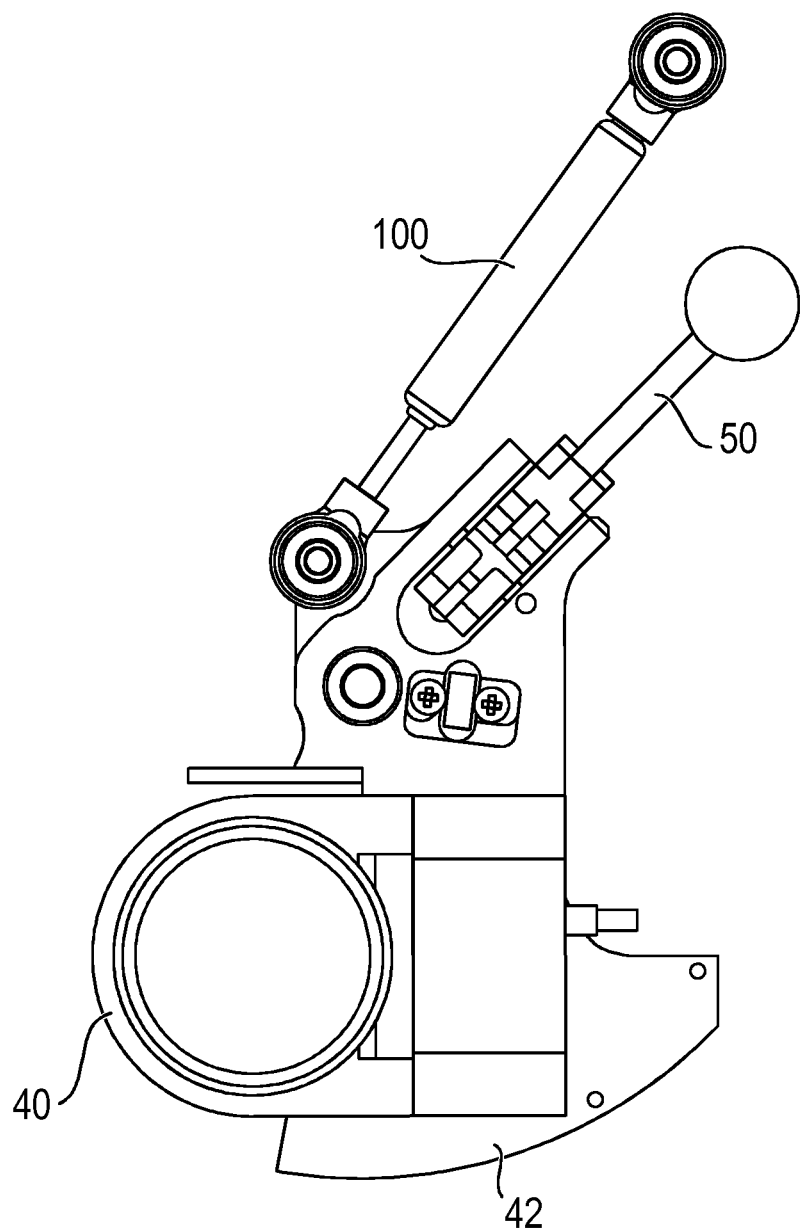
FIG. 13 shows a bottom view of the holder in the swiveled-out state.
Figure 14:
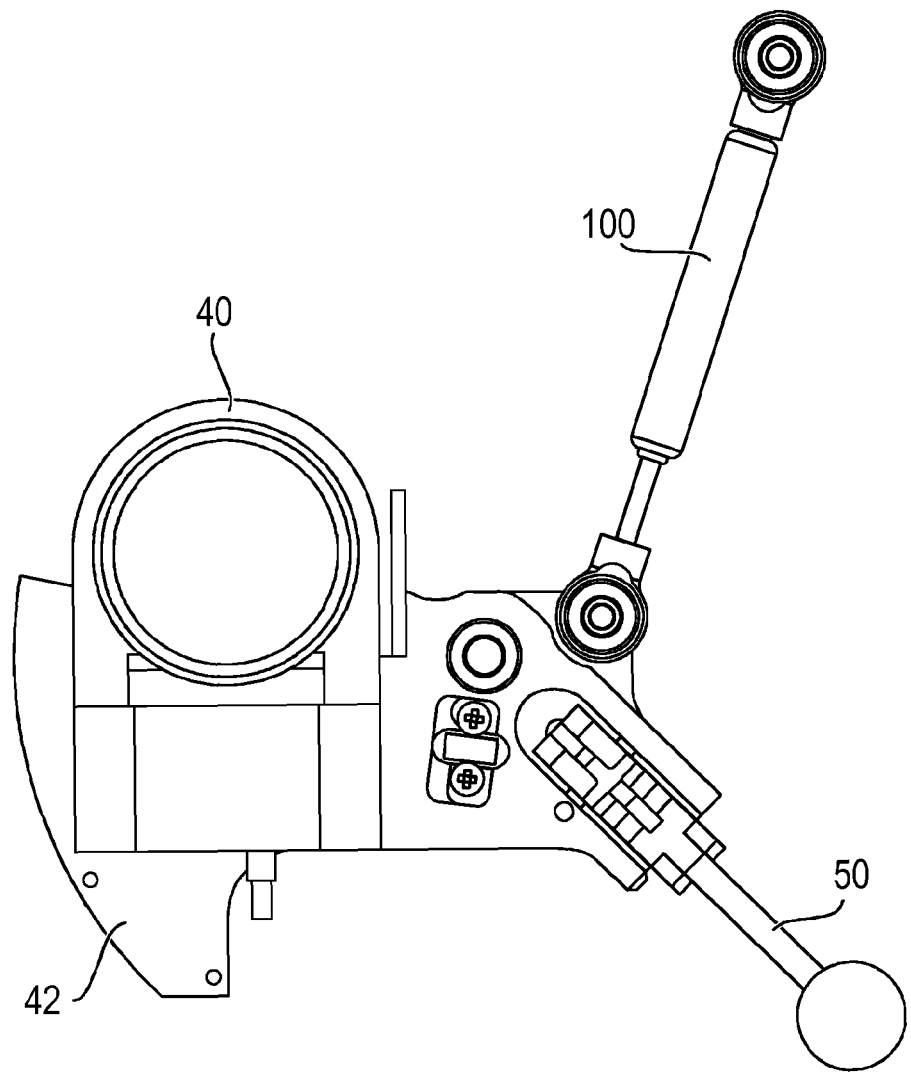
FIG. 14 shows a bottom view of the holder in the swiveled-in state.
Figure 15:
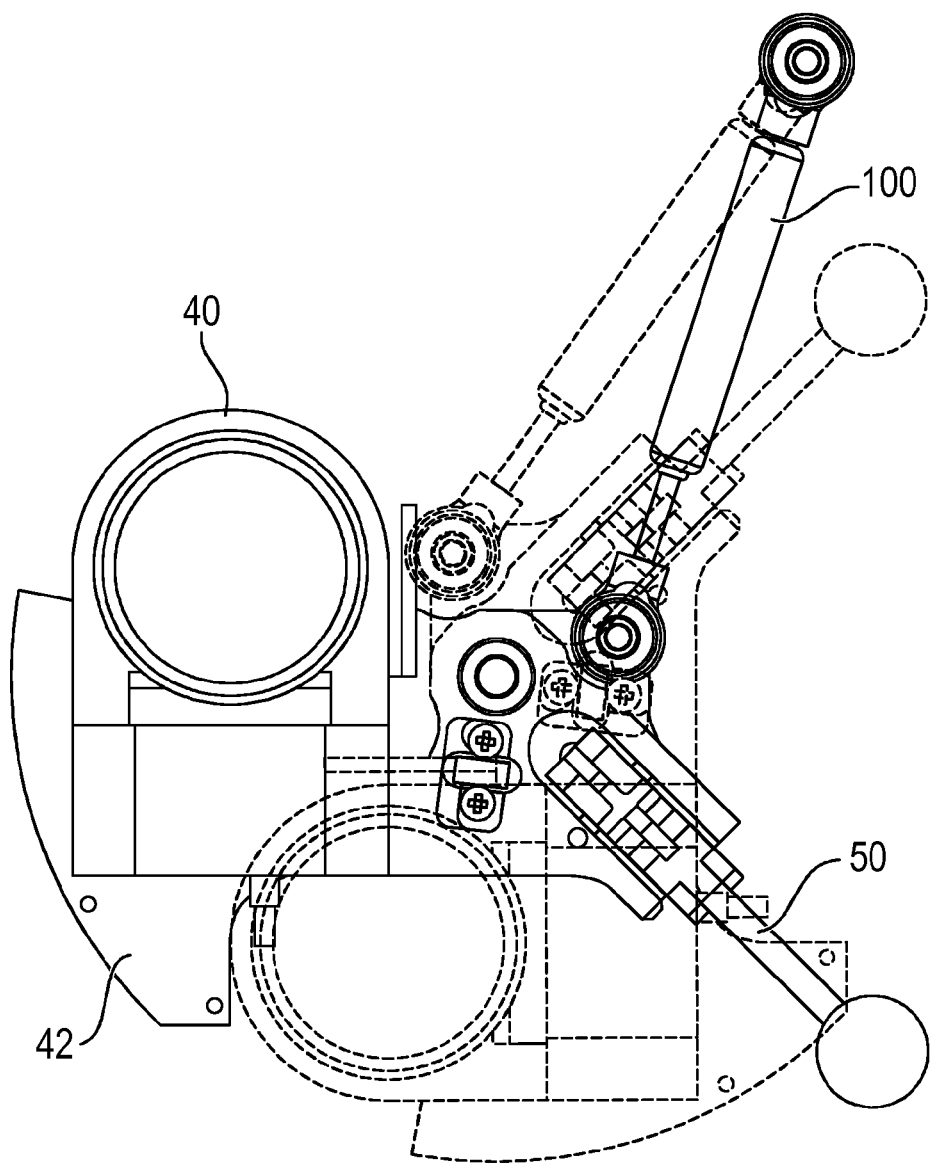
FIG. 15 shows a view in which the states according to FIGS. 13 and 14 are illustrated in a superimposed manner.

The arrangement of the pressure spring 100 relative to the pivot lever 50 is illustrated in the bottom views of FIGS. 13 and 14 for the two afore-mentioned lever end positions. Here, the arrangement shown in FIG. 13 corresponds to the pivot state according to FIG. 3, and the arrangement shown in FIG. 14 corresponds to the pivot state according to FIG. 6.

Figure 6:
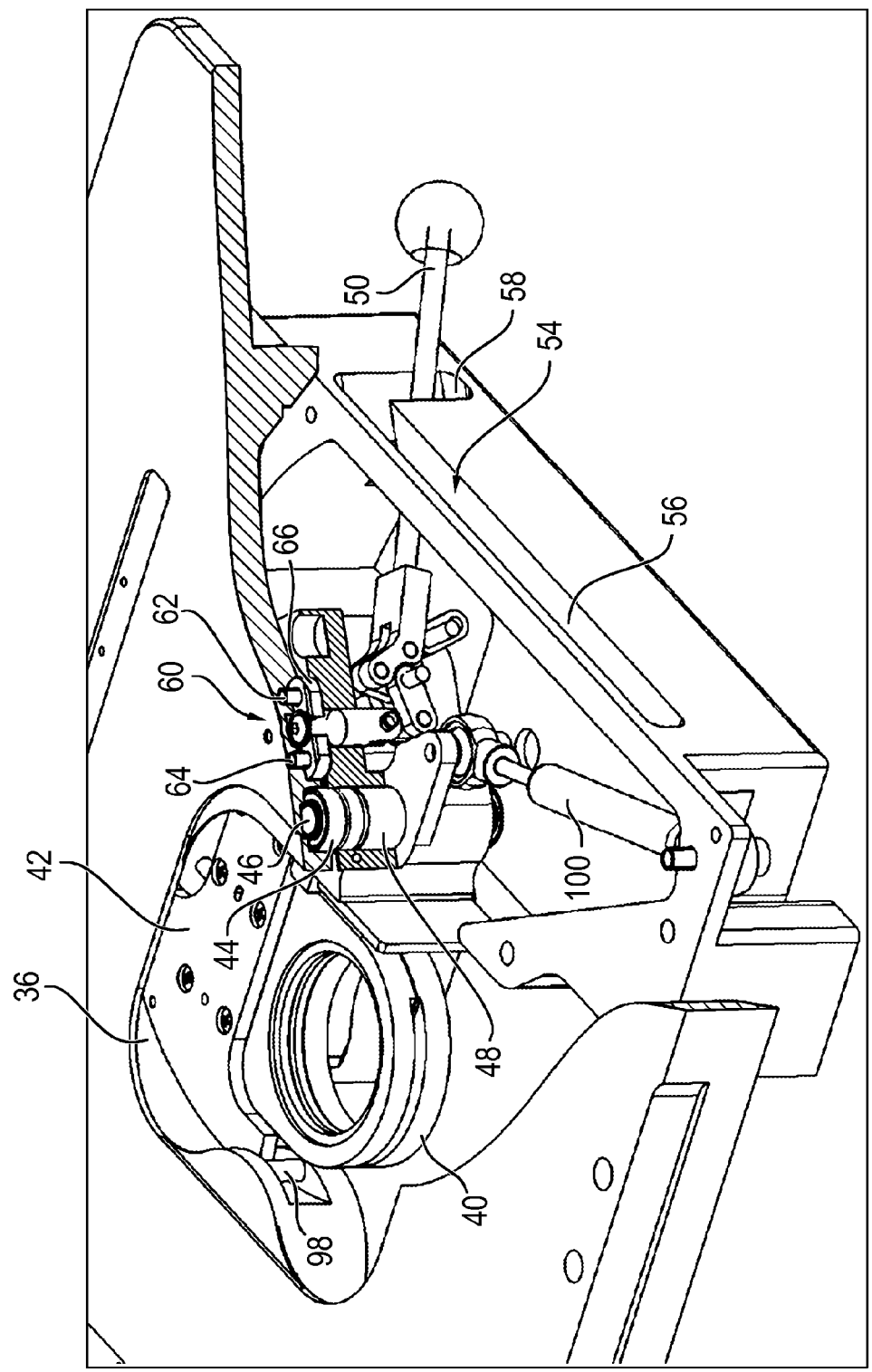
Figure 7:
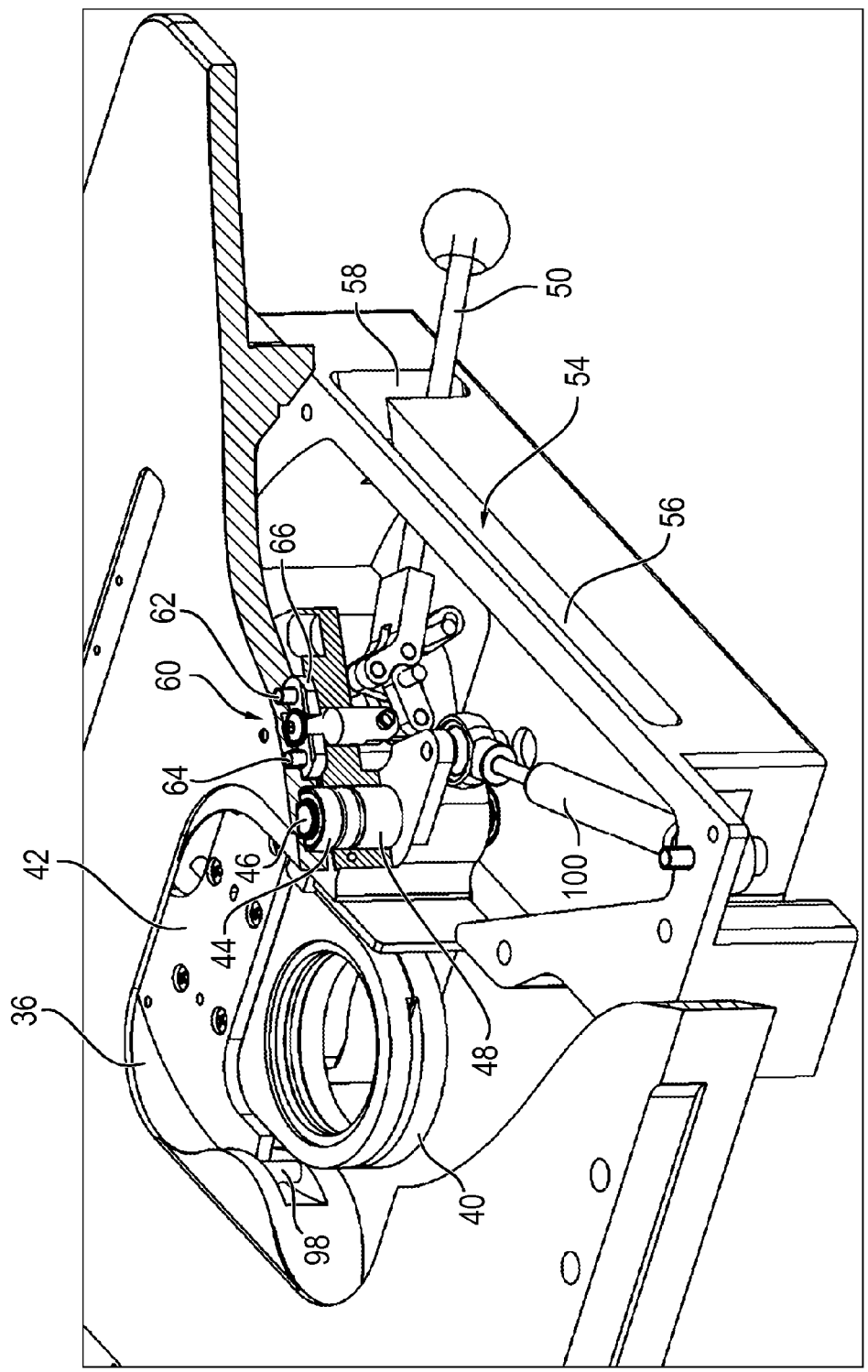

FIGS. 3 to 7 show how the holder 42 together with the objective 38, which is firmly coupled to the holder 42 via the focusing drive 40, is moved from a position in which the holder 42 is pivoted out of the imaging beam path (FIG. 3) at first to its operating position in which the holder 42 rests against the pivot stop 98 and the underside of the platform 16 which likewise forms a stop (FIG. 6), and is finally fixed to the underside of the platform 16 in this operating position (FIG. 7). By moving the pivot lever 50 from its lever end position shown in FIG. 3 to its lever end position shown in FIG. 5 the tightening screw 70 is moved into the recess 68 of the clamping plate 66. Thereafter, the pivot lever 50 is pressed downward within the vertical second guide section 58 of the lever guide 54, as shown in FIG. 6, so far that the upper side of the holder 42 comes into contact with the underside of the platform 16. Thus, the operating position of the holder 42 is reached.

As shown in FIG. 7, the pivot lever 50 is subsequently pressed down further, as a result whereof the tightening screw 70 is pulled downward in a manner described further below until the screw head 72 comes into contact with the upper side of the clamping plate 66 from above. In this way, the holder 42 is tightened against the underside of the platform 16.

Figure 8:
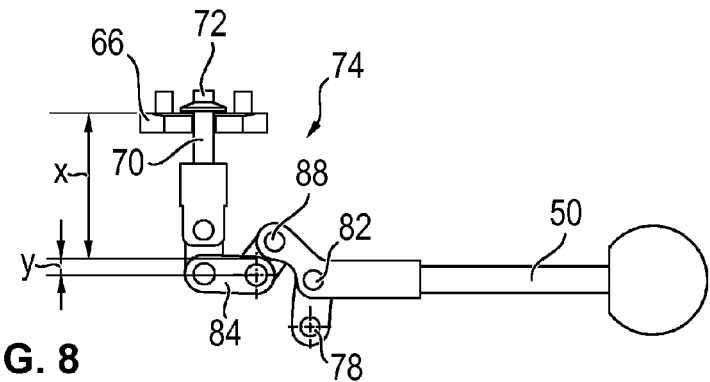
FIGS. 8-11 show side views of a lever and of a locking mechanism actuated by the lever for explaining how the holder is fixed to the platform by pivoting the lever.
Figure 9:
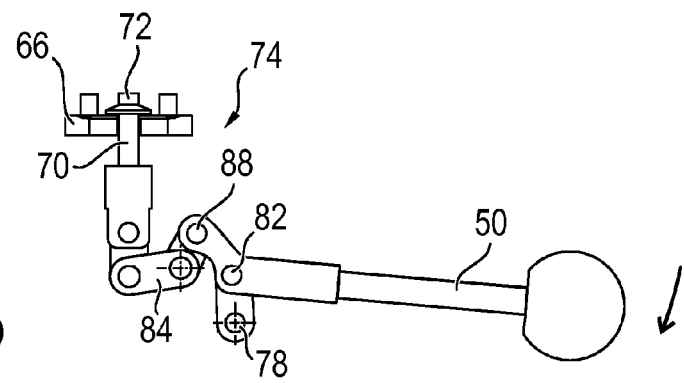
Figure 10:
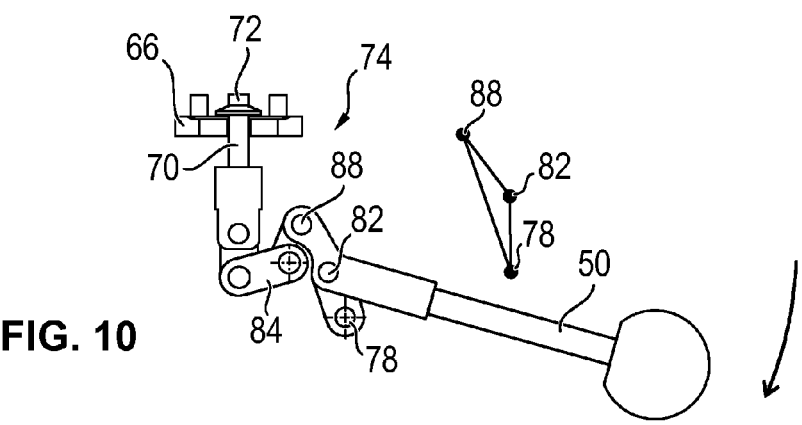

The pressing down of the pivot lever 50 within the vertical second guide section 58 of the lever guide 54 described before with reference to FIGS. 5 to 7 is illustrated once again in FIGS. 8 to 11 with respect to the functioning of the articulated chain 74 which connects the pivot lever 50 to the tightening screw 70. Here, the illustration according to FIG. 8 corresponds to the state shown in FIG. 5 and the illustration according to FIG. 11 corresponds to the state shown in FIG. 7, whereas FIGS. 9 and 10 show intermediate states.

For understanding the functioning of the articulated chain 74 it is, at first, important that the first axis of articulation 78 and the third axis of articulation 86 are stationary axes with respect to the holder 42, whereas the second axis of articulation 82, the fourth axis of articulation 88, the fifth axis of articulation 92 and the sixth axis of articulation 96 move relative to the holder 42 by moving the pivot lever 50. Here, it has to be said that the movements of the fifth axis of articulation 92 and the sixth axis of articulation 96 are only so little that they cannot be seen in FIGS. 8 to 11.

In the articulated chain 74, the third articulated link 84 forms a bistable link which, caused by the actuation of the pivot lever 50, is so to speak switched between two stable positions. This change of the bistable third articulated link 84 is caused in that the holder 42 comes into contact with the underside of the platform 16 by pivoting the pivot lever 50 downward. This corresponds to the transition from the state shown in FIG. 10 to the state shown in FIG. 11.

Figure 11:
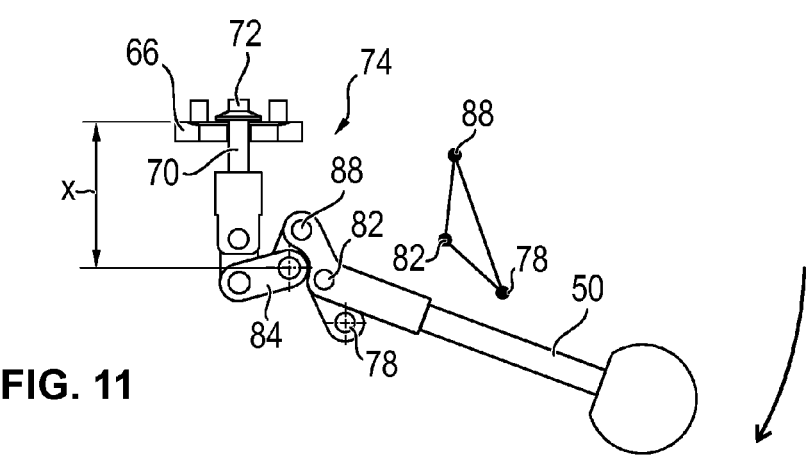

In FIGS. 10 and 11, the change in position of the bistable third articulated link 84 is illustrated each time by the position of the three axes of articulation 78, 82 and 88 which is emphasized in an abstract manner in the form of a triangle of axes. In the state shown in FIG. 10, the axis of articulation 82 is arranged on the right-hand side of the line connecting the two axes of articulation 78 and 88 (these positions of the axes being exaggerated for illustration purposes in the abstract triangle illustration). When the pivot lever 50 is pressed further downward from the state shown in FIG. 10, then the axis of articulation 82 so to speak snaps from the right side to the left side of the line connecting the two axes of articulation 78 and 88 (again illustrated in an exaggerated manner).

In the state shown in FIG. 10, the screw head 72 of the tightening screw 70 still has a certain clearance with respect to the upper side of the clamping plate 66, i.e. it has not yet been tightened against the clamping plate 66. When the bistable third articulated link 84 switches from the state according to FIG. 10 to the state according to FIG. 11, the tightening screw 70 is pulled downward thereby, as a result whereof the screw head 72 of the tightening screw 70 is tightened against the upper side of the clamping plate 66.

Figure 16:
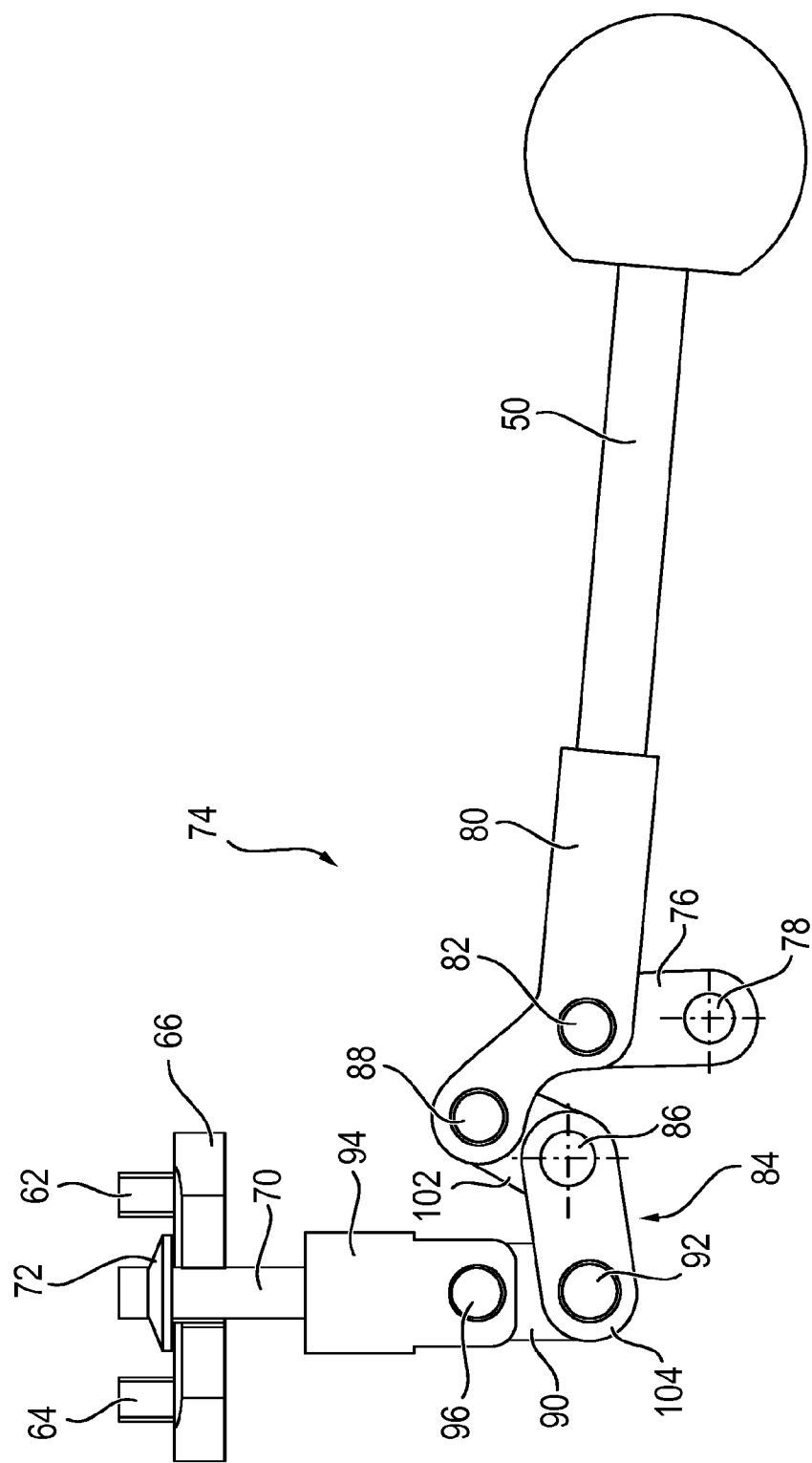
FIG. 16 shows a further side view of the lever and of the locking mechanism actuated by the lever, in which the individual components of the lever and of the locking mechanism are illustrated to a larger scale.

In the articulated chain 74, the bistable third articulated link 86 so to speak forms a rocker which has two articulated parts 102 firmly arranged to each other at a fixed angle, as can be best seen in FIG. 16. The two articulated parts 102 and 104 are commonly mounted about the stationary third axis of articulation 86. The articulated part 102 is further coupled to the second articulated link 80 via the fourth axis of articulation 88, whereas the articulated part 104 is coupled to the fourth articulated link 90 via the fifth axis of articulation 92.

The afore-explained design of the articulated chain 74 ensures that the user, when pivoting the pivot lever 10 from the state shown in FIG. 10 to the state shown in FIG. 11, perceives an increased resistance to operation which again decreases when the state shown in FIG. 11 has been reached. The pivot lever 50 so to speak snaps downward at the transition between the two afore-mentioned states. As a result thereof, the user can see when the holder 42 is tightened against the underside of the platform 16.

In FIG. 11, which shows the tightened state, the vertical clamping distance which the third axis of articulation 86, which is stationary relative to the holder 42, has relative to the upper side of the clamping plate 66 is identified with x. Compared thereto, the distance from the third axis of articulation 86 to the upper side of the clamping plate 66 in the state shown in FIG. 8 in which the tightening screw 70 is not yet tightened against the clamping plate 66 is increased by an additional vertical distance y. This additional distance y corresponds to the lifting height with which the holder 42 is pulled upward from the state shown in FIG. 5 (corresponding to FIG. 8) into the state shown in FIG. 7 (corresponding to FIG. 11) toward the underside of the platform 16.

Figure 12:
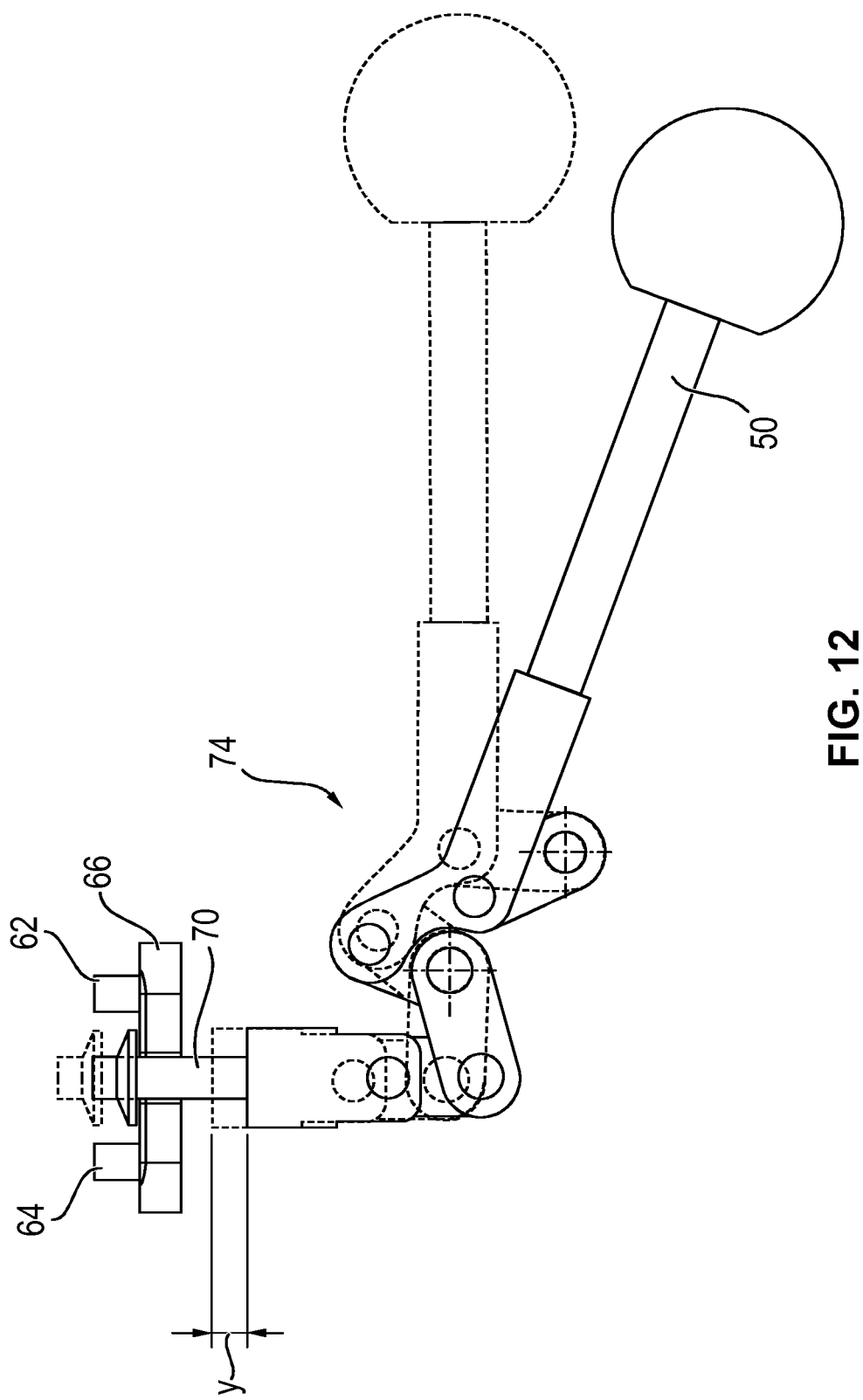
FIG. 12 shows a side view in which the states shown in FIGS. 8 and 11 are illustrated in a superimposed manner.

In FIG. 12, the states shown in FIGS. 8 and 11 are illustrated once again in a superimposed manner. The lifting height y which is shown in FIG. 8 and by which the tightening screw 70 is tightened is illustrated in an exaggeratedly large manner.

The lifting height y can be varied in that the screwing depth with which the tightening screw 70 is screwed into the fifth articulated link 96, which is formed as a threaded sleeve, is varied. As a result thereof, the mounting force with which the holder 42 is tightened against the platform 16 can be set as required.

The invention is not to be limited to the specific embodiments disclosed, and modifications and other embodiments are intended to be included within the scope of the invention.

LIST OF REFERENCE NUMERALS 10 light microscope
12 microscope stand
14 microscope stage
16 platform
18 specimen holder
20 positioning device
22, 24 sliders
26, 28 handwheels
30 eyepieces
32 objective revolver
34 microscope objectives
36 through hole
38 objective
40 focusing drive
42 holder
44 pivot bearing
46 bearing axis
48 Z bearing
50 pivot lever
54 lever guide
56 horizontal guide section
58 vertical guide section
60 locking mechanism
62, 64 pins
66 clamping plate
68 recess
70 tightening screw
72 screw head
74 articulated chain
76 first articulated link
78 first axis of articulation
80 second articulated link
82 second axis of articulation
84 third articulated link
86 third axis of articulation
88 fourth axis of articulation
90 fourth articulated link
92 fifth axis of articulation
94 fifth articulated link
96 sixth axis of articulation
98 pivot stop
100 pressure spring
102, 104 articulated parts

What is claimed is:

1. A microscope stage (14), comprising:
a platform (16);
a holder (42) adapted for holding an objective (38), the holder (42) being pivotally mounted to the platform (16) about a bearing axis (46) that is substantially parallel to an optical axis, the holder (42) being mounted movably along the bearing axis (46);
an operating element (50) coupled to the holder (42), the operating element (50) being pivotable about the bearing axis (46) and movable along the bearing axis (46) with the holder (42) for positioning in an operating position; and
a locking mechanism (60) actuatable by the operating element (50) for fixing the holder (42) in a fixed position relative to the platform (16) when the operating element (50) is in the operating position;
wherein the operating element is a lever (50) which is pivotable in a first plane within a first pivoting range for pivoting the holder (42) about the bearing axis (46) and which is pivotable in a second plane within a second pivoting range for moving the holder (42) along the bearing axis (46), wherein the second plane is perpendicular to the first plane; and
wherein the locking mechanism (60) comprises:
a receptacle (68) mounted to the platform (16); and a locking element (70) coupled to the lever (50) via an articulated chain (74), the locking element being pivotable into the receptacle (68) by pivoting the lever (50) within the first pivoting range, wherein tightening the locking element in the receptacle by pivoting the lever (50) beyond the second pivoting range fixes the holder (42) to the platform (16).

2. The microscope stage (14) according to claim 1, wherein the articulated chain (74) comprises a bistable articulated link (84) coupled to the locking element (70), wherein the articulated chain (74) changes from a first stable position to a second stable position when the lever (50) is pivoted beyond the second pivoting range;
  wherein the locking element (70) is removable from the receptacle (60) via the articulated chain (74) when the bistable articulated link (84) is in the first stable position; and
  wherein the articulated chain (74) tightens the locking element (70) to the receptacle (60) when the bistable articulated link (84) is in the second stable position.

3. The microscope stage (14) according to claim 2, wherein the articulated chain (74) provides an increased resistance to operation of the lever (50) when the bistable articulated link (84) is changed between the first stable position and the second stable position.

4. The microscope stage (14) according to claim 2, wherein the articulated chain (74) comprises:
  a first articulated link (76) pivotable about a first axis of articulation (78) that is stationary relative to the holder (42);
  a second articulated link (80) firmly mounted to the lever (50) and pivotally coupled to the first articulated link (76) about a second axis of articulation (82);
  a third articulated link that forms the bistable articulated link (84), the third articulated link being pivotally mounted about a third axis of articulation (86) that is stationary relative to the holder (42) and being pivotally coupled to the second articulated link (80) about a fourth axis of articulation (88);
  a fourth articulated link (90) pivotally coupled to the bistable articulated link (84) about a fifth axis of articulation (92); and
  a fifth articulated link (94) pivotally coupled to the fourth articulated link (90) about a sixth axis of articulation (96) and connected to the locking element (70).

5. The microscope stage (14) according to claim 4, wherein the bistable articulated link (84) is a rocker having two articulated parts (102, 104), the two articulated parts (102, 104) being firmly arranged at a fixed angle relative to each other and commonly mounted about the third axis of articulation (86) that is stationary relative to the holder (42);
  wherein a first (102) of the two articulated parts is coupled to the second articulated link (80) via the fourth axis of articulation (88) and a second (104) of the two articulated parts is coupled to the fourth articulated link (90) via the fifth axis of articulation (92).

6. The microscope stage (14) according to claim 1, wherein the locking element is a pin (70) having an enlarged pin head (72);
  wherein the receptacle (60) is a clamping plate (66) mounted to the platform (16), the clamping plate (66) having a contact surface for the pin head (72) and having a recess (68) into which the pin (70) can be pivoted, the recess being open at one side, and
  wherein the pin head (72) can be tightened against the contact surface for fixing the holder (42) to the platform (16).

7. The microscope stage (14) according to claim 6, wherein the pin is a screw (70) and the fifth articulated link is a threaded sleeve (94) into which the screw (70) is screwed.

8. The microscope stage (14) according to claim 7, wherein the holder (42) is configured to be tightened by varying depth of the screw (70) within the threaded sleeve (94).

9. The microscope stage (14) according to claim 1, wherein the holder (42) rests in the operating position against a first stop (98) which limits pivoting motion of the holder (42) about the bearing axis (46) and rests in the operating position against a second stop which limits movement of the holder (42) along the bearing axis (46).

10. The microscope stage (14) according to claim 9, wherein the second stop is formed by the platform (16).

11. The microscope stage (14) according to claim 1, further comprising a lever guide (54) having a first guide section (56) which lies in the first plane, and a second guide section (58) which lies in the second plane and extends from the first guide section (56).

12. The microscope stage (14) according to claim 1, wherein an objective (38) held by the holder (42) is arranged in a through hole (36) formed in the platform (16) when the holder (42) is in the operating position.

13. A microscope (10) having a microscope stage (14) according to claim 1 and having an imaging beam path; and
  an objective revolver (32) for selectively pivoting one of several microscope objectives (34) held on the objective revolver (32) into the imaging beam path.

14. The microscope (10) according to claim 13, wherein the microscope is a confocal scanning microscope for high-resolution localization microscopy.

15. A microscope stage (14), comprising:
  a platform (16);
  a holder (42) adapted for holding an objective (38), the holder (42) being pivotally mounted to the platform (16) about a bearing axis (46) that is substantially parallel to an optical axis, the holder (42) being mounted movably along the bearing axis (46);
  an operating element (50) coupled to the holder (42), the operating element (50) being pivotable about the bearing axis (46) and movable along the bearing axis (46) with the holder (42) for positioning in an operating position;
  a locking mechanism (60) actuatable by the operating element (50) for fixing the holder (42) in a fixed position relative to the platform (16) when the operating element (50) is in the operating position; and
  a pressure spring (100) having a spring force, the pressure spring (100) arranged substantially parallel to the first plane, and having a first end mounted rotatably to the holder (42) and a second end mounted rotatably to a stationary part of the microscope stage (14);
  wherein the operating element is a lever (50) which is pivotable in a first plane within a first pivoting range for pivoting the holder (42) about the bearing axis (46) and which is pivotable in a second plane within a second pivoting range for moving the holder (42) along the bearing axis (46), wherein the second plane is perpendicular to the first plane; and
  wherein the pressure spring (100) biases the lever (50) away from a mid-position of the first pivoting range, toward lever end positions, the lever end positions corresponding to a first lever end position at a first end of the first pivoting range and a second lever end position at a second end of the first pivoting range, the mid-position of the first pivoting range being approximately between the lever end positions.

16. The microscope stage (14) according to claim 15, wherein the holder (42) rests in the operating position against a first stop (98) which limits pivoting motion of the holder (42) about the bearing axis (46) and rests in the operating position against a second stop which limits movement of the holder (42) along the bearing axis (46).

17. The microscope stage (14) according to claim 15, further comprising a lever guide (54) having a first guide section (56) which lies in the first plane, and a second guide section (58) which lies in the second plane and extends from the first guide section (56).

18. The microscope stage (14) according to claim 15, wherein an objective (38) held by the holder (42) is arranged in a through hole (36) formed in the platform (16) when the holder (42) is in the operating position.

19. A microscope (10) having a microscope stage (14) according to claim 15 and having an imaging beam path; and
   an objective revolver (32) for selectively pivoting one of several microscope objectives (34) held on the objective revolver (32) into the imaging beam path.

* * * * *